(12) United States Patent
Sommer et al.

(10) Patent No.: US 10,222,675 B2
(45) Date of Patent: Mar. 5, 2019

(54) THIN FILM PLASMONIC OPTICAL MODULATOR

(71) Applicants: II-VI Incorporated, Saxonburg, PA (US); Cornell University, Ithaca, NY (US)

(72) Inventors: Thomas Radford Sommer, Sebastopol, CA (US); Jared Hillel Strait, Ithaca, NY (US); Michael Spencer, Ithaca, NY (US); Farhan Rana, Ithaca, NY (US)

(73) Assignees: II-VI Incorporated, Saxonburg, PA (US); Cornell University, Ithaca, NY (US)

( * ) Notice: Subject to any disclaimer, the term of this patent is extended or adjusted under 35 U.S.C. 154(b) by 0 days.

(21) Appl. No.: 15/632,672

(22) Filed: Jun. 26, 2017

(65) Prior Publication Data

US 2018/0004061 A1   Jan. 4, 2018

Related U.S. Application Data

(60) Provisional application No. 62/356,837, filed on Jun. 30, 2016.

(51) Int. Cl.
*G02F 1/07* (2006.01)
*G02B 26/00* (2006.01)
(Continued)

(52) U.S. Cl.
CPC .............. *G02F 1/17* (2013.01); *G02F 1/0018* (2013.01); *G02F 2203/01* (2013.01);
(Continued)

(58) Field of Classification Search
CPC . B82Y 20/00; G02F 1/157; G02F 1/01; G02F 1/155; G02F 1/0121
(Continued)

(56) References Cited

U.S. PATENT DOCUMENTS 8,755,662 B2   6/2014   Kim
8,983,251 B2   3/2015   Lu et al.
(Continued)

OTHER PUBLICATIONS

Liu, Ming et al., "Double-Layer Graphene Optical Modulator", American Chemical Society, Nano Letters 2012, 12, 1482-1485.
(Continued)

*Primary Examiner* — Mohammed Hasan
(74) *Attorney, Agent, or Firm* — Wendy W. Koba

(57) ABSTRACT

A plasmon-based optical modulator comprises a substrate, a layer of high reflectivity material disposed over the substrate, a relatively thin dielectric layer disposed over a top major surface of the layer of high reflectivity material and a plurality of graphene strips disposed in parallel across a top major surface of the relatively thin dielectric layer, each graphene strip exhibiting a predetermined width w, with adjacent strips separated by a predetermined spacing s. A first electrical contact is coupled to the plurality of graphene strips and a second electrical contact is coupled to the layer of high reflectivity material, where the values of w, s, and voltage applied between the first and second electrical contacts determines a resonant wavelength of the plasmon-based optical modulator, with changes in the applied voltage changing between absorption and non-absorption of an applied optical input signal.

17 Claims, 4 Drawing Sheets

(51) Int. Cl.
*G02F 1/17* (2019.01)
*G02F 1/00* (2006.01)

(52) U.S. Cl.
CPC .... *G02F 2203/02* (2013.01); *G02F 2203/055* (2013.01); *G02F 2203/10* (2013.01); *G02F 2203/11* (2013.01)

(58) Field of Classification Search
USPC .................................................. 359/245, 237
See application file for complete search history.

(56) References Cited

U.S. PATENT DOCUMENTS

| | | | |
|---|---|---|---|
| 9,014,521 | B1 | 4/2015 | Sayyah |
| 9,042,683 | B2 | 5/2015 | Cho et al. |
| 9,105,791 | B1 | 8/2015 | Dyer et al. |
| 9,184,553 | B2 | 11/2015 | Ozyilmaz et al. |
| 9,261,714 | B2 | 2/2016 | Kim et al. |
| 9,297,955 | B2 | 3/2016 | Bartoli et al. |
| 9,470,632 | B2 | 10/2016 | Farmer |
| 2013/0062104 | A1 | 3/2013 | Craighead et al. |
| 2014/0023321 | A1 | 1/2014 | Lu et al. |
| 2014/0056551 | A1 | 2/2014 | Liu et al. |
| 2014/0240812 | A1 | 8/2014 | Han et al. |
| 2014/0319385 | A1* | 10/2014 | Mikhailov .......... H01L 29/4238 250/493.1 |
| 2015/0162993 | A1 | 6/2015 | Akyildiz et al. |
| 2015/0168747 | A1 | 6/2015 | Kadono et al. |
| 2015/0369735 | A1* | 12/2015 | Avouris ............... G01N 21/554 356/445 |
| 2016/0033401 | A1 | 2/2016 | Farmer |
| 2016/0202505 | A1 | 7/2016 | Wu et al. |

OTHER PUBLICATIONS

Kim, Seyoon, et al., "Electronically Tunable Extraordinary Optical Transmission in Graphene Plasmonic Ribbons Coupled to Wavelength Metallic Slit Arrays", Nature Communications, Aug. 8, 2016, pp. 1-8.

Kim, Yunjung, et al., "Low-dimensional gap plasmons for enhanced light-graphene interactions", Scientific Reports, Feb. 27, 2017, pp. 1-7.

Li, Wei, et al., "Utrafast All-Optical Graphene Modulator", American Chemical Society, Nano Letters 2014, 14, 955-959.

* cited by examiner

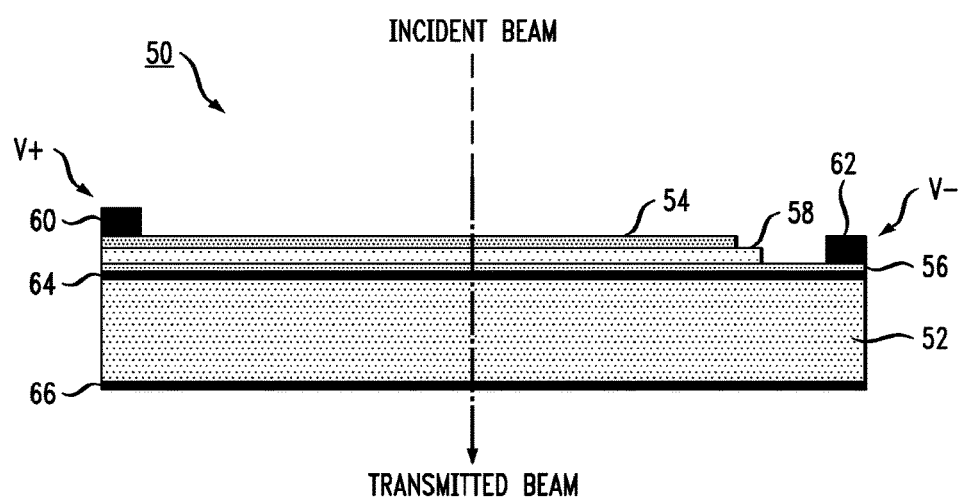

THIN FILM PLASMONIC OPTICAL MODULATOR

CROSS-REFERENCE TO RELATED APPLICATIONS

This application claims the benefit of U.S. Provisional Application Ser. No. 62/356,837, filed Jun. 30, 2016, and herein incorporated by reference.

TECHNICAL FIELD

The present invention relates to optical modulators and, more particularly, to graphene-based thin film plasmonic modulators.

BACKGROUND OF THE INVENTION

Optical modulators based on interferometric or resonant waveguide structures modulate light by introducing a change in the effective refractive index of the optical material, which provides a shift in the optical phase of a lightwave passing through the modulator structure. Transmission rates of 400 GHz (and higher) are pushing the limits of conventional, $LiNbO_3$-based optical modulators beyond the physical capabilities of the lithium niobate material itself. A $LiNbO_3$ modulator is based on a linear electro-optic effect and exhibits a relatively low degree of modulation as a function of length of the device. As a result, this type of linear electro-optic effect modulator requires either relatively high drive voltages (unwanted heat), or a relatively long length of device (trending away from the "small size" requirement), or both. Lithium niobate is also known to have a limited modulation bandwidth. Current $LiNbO_3$ modulator configurations have a large thermal drift, requiring fast control to stabilize operation.

The continuing migration to smaller package sizes (e.g., CFP to CFP2 to QSFP and beyond) reduces the available space for optical modulators and thus increases component density. There is also an increasing demand to lower power consumption by various ones of these optical devices. Advanced modulation formats (e.g., DQ-PSK and 16QAM) require better extinction ratios (ER), better linearity, lower insertion loss (IL), lower noise and higher modulation bandwidth than possible with $LiNbO_3$-based devices.

SUMMARY OF THE INVENTION

The needs of the prior art are addressed by the present invention, which relates to optical modulators and, more particularly, to graphene-based plasmonic modulators.

In accordance with one or more embodiments of the present invention, a thin film plasmonic optical modulator is formed by utilizing a layer of graphene strips as the optically active element of the modulator. The modulator itself is formed on a substrate of a suitable optical material (e.g., SiC, $SiO_2$, $Al_2O_3$, etc.), where the substrate is covered with a layer of highly reflective structure (such as a layer (or layers) of metal or a dielectric mirror configuration). A relatively thin layer of dielectric material (i.e., having an optical thickness of about a quarter of the incident optical wavelength) is disposed over the highly reflective layer, and the graphene strips are formed on the dielectric layer. The physical properties of the strips (width and separation), as well as a DC voltage applied to the strips, determine the resonant wavelength of the device. That is, when the thin film plasmonic optical modulator is configured to exhibit resonance at the wavelength of the incident optical signal, the optical power is absorbed. When the modulator is then "tuned" away from this resonant wavelength (by changing the DC voltage/conductivity of the graphene strips), the incoming optical signal will not be absorbed. The application of a differential (modulating) voltage to change the conductivity of the graphene strips therefore functions to change the resonant wavelength of the modulator, and the incoming optical signal (at a fixed wavelength) will either be absorbed or not absorbed, depending on the resonant wavelength of the modulator as a function of time (creating the desired modulation effect).

The device may be configured to be used in the "reflecting" mode, where when the device is tuned to a resonant wavelength away from the fixed wavelength of the light source and the optical signal is not absorbed, the incident optical wave will be reflected off of the HR layer and re-directed away from the device. In alternative embodiments, the modulator may be configured for use as a "transmissive" device such that when the modulator is tuned to exhibit a resonance away from the (fixed) optical signal wavelength, the non-absorbed incident optical radiation will pass through all of the layers of the modulator structure. In the case of a transmissive modulator, therefore, all of the materials selected to form the modulator are required to be transparent over the wavelength range of interest.

In at least one other embodiment, a second set of graphene strips (again, separated from an underlying layer by a dielectric layer) is disposed over and aligned with the first set of graphene strips. In this embodiment, modulation occurs between the sets of strips and thus exhibits less capacitive effects (and can operate at higher speeds, such as a few hundred GHz) than embodiments utilizing a layer of reflective material.

An exemplary embodiment of the present invention takes the form of a plasmon-based optical modulator comprising a substrate, a high reflectivity material disposed over the substrate, a relatively thin dielectric layer disposed over a top major surface of the high reflectivity material, and a plurality of graphene strips disposed in parallel across a top major surface of the relatively thin dielectric layer. Each graphene strip exhibiting a predetermined width $\underline{w}$, with adjacent strips separated by a predetermined spacing $\underline{s}$, where the values of $\underline{w}$, $\underline{s}$, and a DV voltage applied to the plurality of graphene strips determines a resonant wavelength of the plasmon-based optical modulator. In this case, a resonant wavelength of a plasmon-based modulator is defined as the wavelength at which an incoming optical beam is absorbed by surface plasmons created along an interface between the plurality of graphene strips and the dielectric layer. In accordance with the present invention, the application of a modulating electrical signal to the plurality of graphene strips modulates the resonant wavelength of the plasmon-based optical modulator and provides a modulation between absorption and non-absorption of the incoming optical beam as a function of its wavelength.

Other and further aspects and embodiments of the present invention will become apparent during the course of the following discussion and by reference to the accompanying drawings.

BRIEF DESCRIPTION OF THE DRAWINGS

Referring now to the drawings,

FIG. 7 illustrates an exemplary graphene-based thin film plasmonic optical modulator of the present invention that is configured to operate in transmission mode.

DETAILED DESCRIPTION OF THE INVENTION

Surface plasmons are produced from the interaction of optical energy with a conductive material at a metal-dielectric interface. If the conductive surface is fabricated into patterned microribbons, the plasmons can be confined to discrete modes. These confined plasmon modes can couple directly to incident electromagnetic waves. Graphene plasmons exhibit strong electromagnetic confinement, making graphene microribbons an excellent material choice for an optical modulator.

Figure 1:
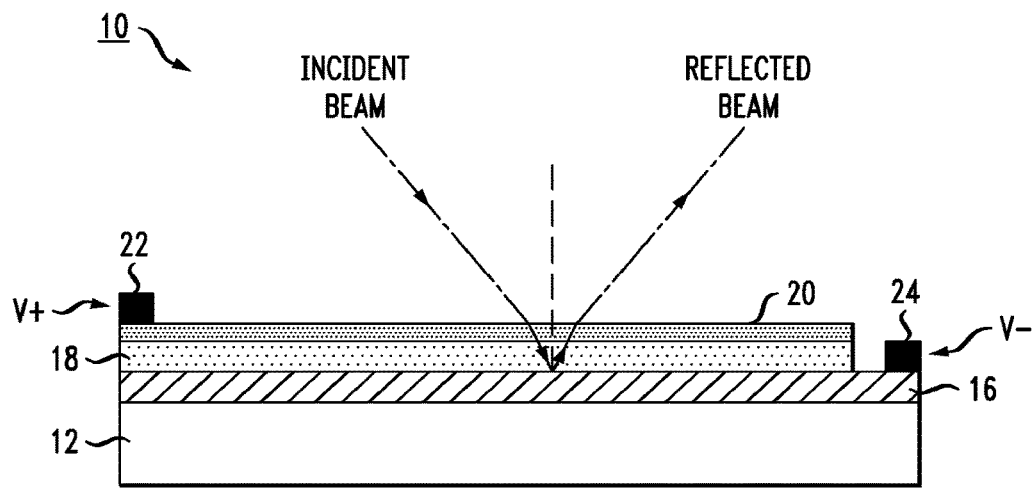
FIG. 1 is a side view of an exemplary graphene-based thin film plasmonic optical modulator formed in accordance with the present invention.
Figure 2:
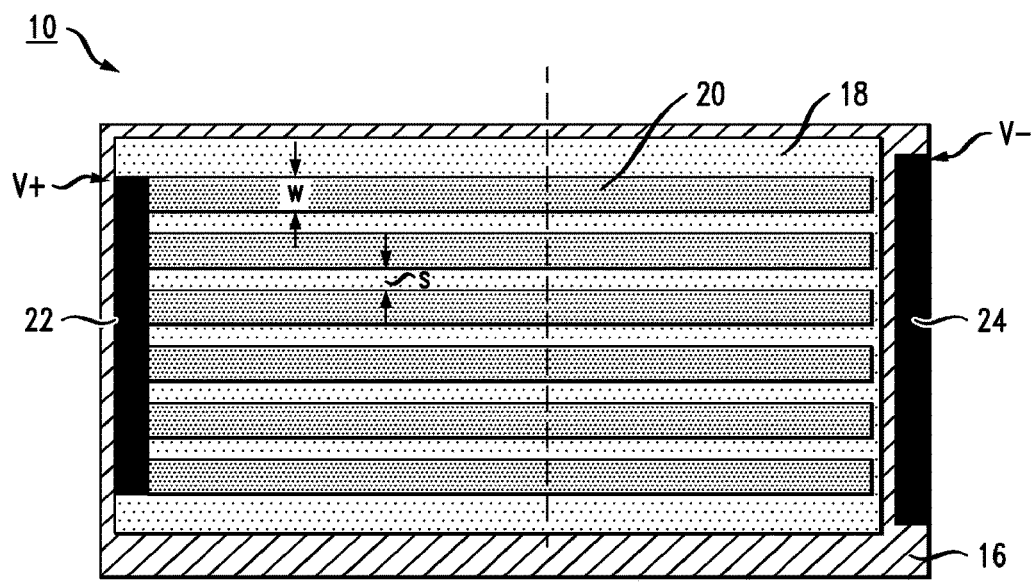
FIG. 2 is a top view of the device of FIG. 1, illustrating the topology of the plurality of graphene strips used in the formation of the modulating device.

A graphene-based thin film plasmonic optical modulator 10 formed in accordance with one or more embodiments of the present invention is shown in FIG. 1. Modulator 10 consists of a substrate 12 covered by a highly reflective (HR) layer 16. A relatively thin dielectric layer 18 is disposed over HR layer 16, and a plurality of graphene strips 20 is disposed across the surface of dielectric layer 18. FIG. 2 is a top view of modulator 10, illustrating the placement of graphene strips 20 across the surface of dielectric layer 18. Electrical contacts 22 and 24 are also shown in both FIGS. 1 and 2. Electrical contact 22 is shown as coupled to graphene strips 22. Electrical contact 24 is coupled to the opposing side of modulator 10. In embodiments where HR layer 16 is also a conductive material (such as a metal), electrical contact 24 is disposed on HR layer 16. Otherwise, an additional metal contact layer is created across the surface of HR layer 16 and used to provide electrical connection to contact 24.

In one embodiment, substrate 12 may comprise intrinsic SiC. In this case, HR layer 16 may take the form of a heavily doped (n-type) SiC layer. Inasmuch as n-SiC is also conductive, HR layer 16 formed of n-SiC may also be used as the contact to electrical contact 24. Other materials, such as $SiO_2$ or $Al_2O_3$ may also be used to form substrate 12.

As mentioned above, HR layer 16 may comprise a metal (for example, Au, Ag, Cu, Al, etc.). Inasmuch as these materials are conductive as well as highly reflective, electrical contact 24 may be disposed directly on an end region of HR layer 16. In other embodiments of the present invention, HR layer 16 may take the form of a dielectric mirror and comprise several layers of materials known to provide the desired degree of reflectivity (such as, for example, alternating layers of silica and tantala). Since a dielectric mirror is not conductive, an additional metal contact layer (not shown) is required to provide electrical connection to contact 24.

Continuing with the description of modulator 10 of FIG. 1, dielectric layer 18 is formed to comprise an optical thickness of about a quarter-wave value of the wavelength of the incident optical signal. For example, if the incoming optical beam is operating at a wavelength of 1500 nm, dielectric layer 18 is formed to have an optical thickness of about 375 nm. Dielectric layer 18 may comprise boron nitride (BN), which is one example of a preferred material for use with the material system of the present invention. Other dielectrics (such as, but not limited to, $SiO_2$) may be used if configured to exhibit the dielectric strength necessary to withstand the application of DC bias voltages.

In accordance with one or more embodiments of the present invention, an exemplary thin film plasmonic modulator configuration is formed by disposing a layer of graphene strips 20 over dielectric layer 18. For the sake of clarity, only a relatively few graphene strips are shown in the illustration of FIG. 2. It is to be understood that in most cases an optical modulator formed in accordance with these embodiments of the present invention may include hundreds of graphene strips disposed across a layer of dielectric material, where the size of the configuration of strips is predicated on the optical beam spot size impinging the modulator.

The resonant wavelength (frequency) of modulator 10 is initially defined by the width $\underline{w}$ of each strip $20_i$ and the spacing $\underline{s}$ between adjacent strips, which control the confinement of free carrier ions across the surface of the device. For the purposes of the present invention, "resonant wavelength" means the wavelength of optical energy absorbed by the modulator structure. Thus, for an incident optical signal of a given, fixed wavelength, it will be absorbed by the modulator (actually, absorbed by the surface plasmons formed in conjunction with the graphene strips) if its wavelength is the same as the resonant wavelength of modulator 10.

Figure 3:
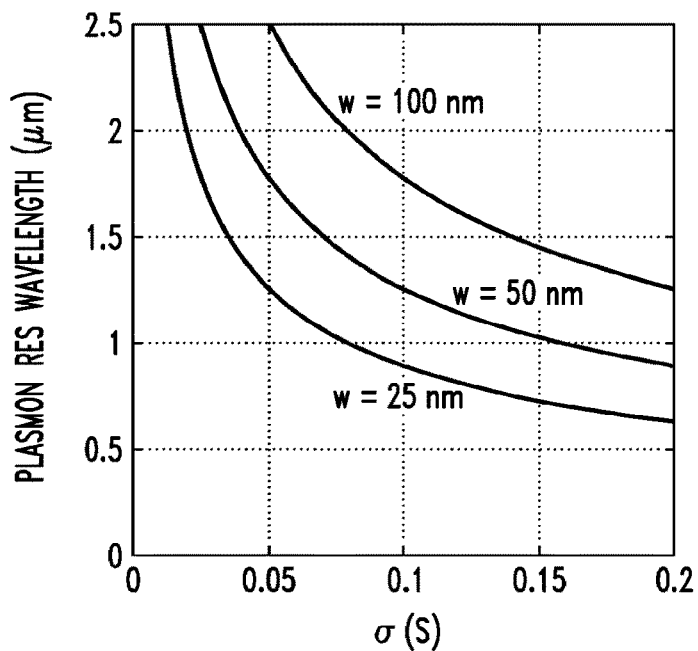
FIG. 3 contains a set of plots showing the change in resonant wavelength as a function of the change in conductivity of the graphene strips.
Figure 4:
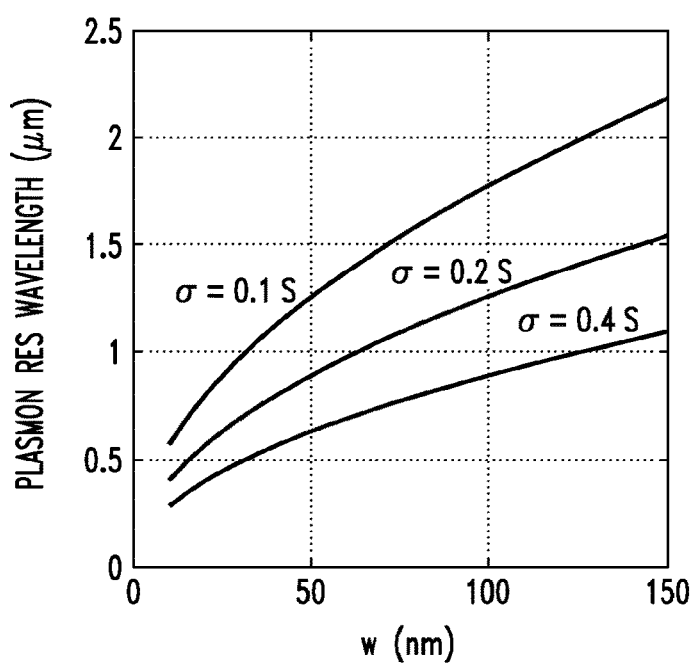
FIG. 4 contains a set of plots showing the change in resonant wavelength as a function of the width of the graphene strips.

The resonant wavelength of modulator 10 may also be "electrically tuned" by adjusting the bias voltage applied across the device. As best shown in FIG. 1, modulator 10 includes a first terminal 22 (V+) coupled to the plurality of graphene strips 20 and a second terminal 24 (V−) coupled to HR layer 16. The application of specific DC voltages to these terminals 22, 24 will affect the carrier density of the surface plasmons and, in turn, change the resonant wavelength of modulator 10. FIG. 3 contains a set of plots showing the how the width (w) of strips 20 can be used to control the resonant wavelength of modulator 10. FIG. 4 contains a set of plots showing how the conductivity of graphene strips 20 (as a function of the voltage applied to strips 20) can be used to control the resonant wavelength of modulator 10.

As will be described below, when operated in differential mode, the application of an AC voltage between V+ terminal 22 and V− terminal 24 is used to "modulate" the resonant wavelength of modulator 10 and thereby provide as an output a modulated optical signal as the output of the device. By using an input data signal as the electrical input applied to terminals 22, 24, modulator 10 creates an optical data signal output.

In accordance with the properties of the thin film graphene, almost 100% modulation depth is possible in the modulator structure formed in accordance with the present invention. That is, when the modulator is biased (by voltages applied to terminals 22, 24) to exhibit a resonant wavelength substantially the same as the incoming optical signal, all of the incident optical radiation will be absorbed (e.g., "no light" reflected), where this state may be equated with a logic "0" when transmitting digital signals. When the bias applied to the modulator is changed, the resonant wavelength changes such that all of the incident optical radiation will be reflected. This high modulation depth has been found possible over the entire near-IR wavelength range of interest for communication applications (typically, about 1500-1600 nm), using a single (widely tunable) thin film graphene-based plasmonic optical modulator and adjusting the applied DC bias voltage. Modulation speeds of over a few hundred GHz (e.g., about 300 GHz or so) are attainable with a graphene-based device, as a result of its extremely high conductivity (and very low RC time constant).

In this reflective configuration of the optical modulator, when an optical beam at the modulator's resonant wavelength impinges graphene strips 20, most of the energy will be absorbed by the confined plasmons. Any residual optical signal that is not absorbed will continue to propagate downward through dielectric layer 18 to HR layer 16, which will then re-direct the energy back toward the plasmons through dielectric layer 18 a second time. Since dielectric layer 18 is selected to exhibit a quarter-wave thickness, the two absorbed waves will be 180 degrees out of phase and destructively interfere at the surface of graphene strips 20. The resulting effect is a very high extinction ratio.

Thus, in operation of the illustrative embodiment, an incident light beam (as shown in FIG. 1) is reflected by modulator 10 when the voltage applied to graphene strips 20 creates a modulator resonance that is tuned to wavelengths away from the wavelength of the incident light beam. That is, the incident light beam is reflected when the voltage applied to terminals 22, 24 modifies the carrier mobility within the plasmon surface waves to shift away from the resonant wavelength otherwise defined by the physical parameters of the strips. Alternatively, the incident light beam is "absorbed" when the voltage applied to terminal 22 is selected to tune to resonance of modulator 10 to the wavelength of the incident light beam. The reflected beam may be equated with the transmission of a logic "one" and the absorption of the incoming beam equated with the transmission of a logic "zero" (for example).

Figure 5:
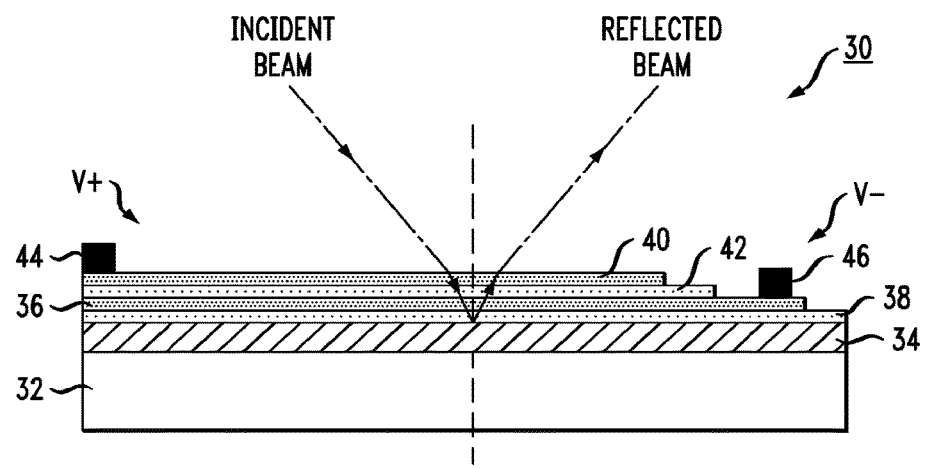
FIG. 5 is a side view of an alternative embodiment of the present invention, in this case comprising a pair of layers of graphene strips.

FIG. 5 illustrates a different embodiment of the present invention, in this case in the form of a double-layer graphene structure. As shown, an optical modulator 30 utilizes two separate layers of graphene strips, separated by a dielectric material. As with the above-described embodiment, optical modulator 30 is formed on a substrate 32 which is comprised of any other suitable dielectric material. Substrate 32 is covered with an HR layer 34, which may comprise a metal or dielectric mirror (e.g., a "stack" of multiple layers, typically alternating layers of high and low index materials such as tantala and silica, respectively). HR layer 34 is separated from a first, lower layer of graphene strips 36 by a layer 38 of dielectric material (such as $SiO_2$, BN, or the like) that is transparent at the wavelengths of interest. As with the embodiment discussed above, dielectric layer 38 is formed to exhibit an optical thickness of about one-quarter of the wavelength of the incoming optical signal (e.g., an optical thickness of 375 nm for an optical signal operating at 1550 nm).

Figure 6:
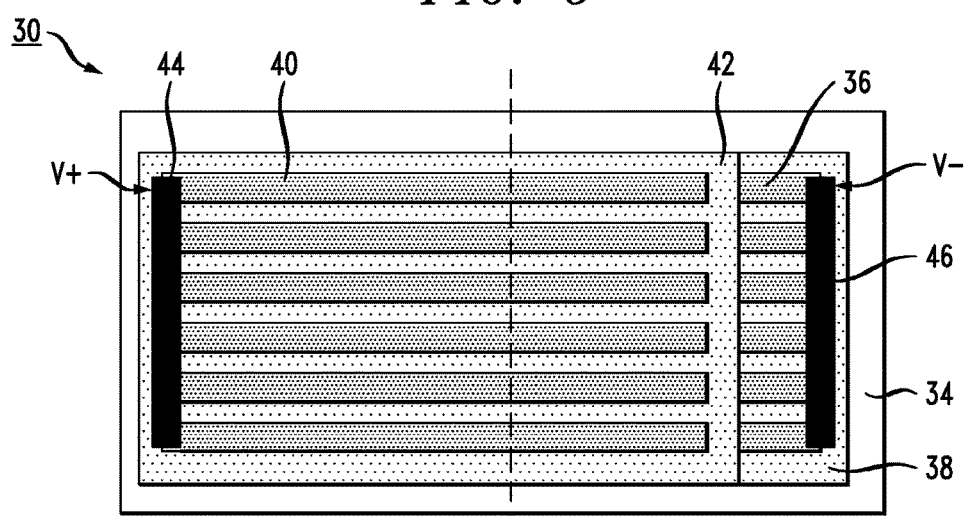
FIG. 6 is a top view of the modulator of FIG. 6, showing the disposition of a second set of graphene strips.

Continuing with a description of this particular embodiment of the present invention, a second, upper layer of graphene strips 40 is included and is positioned to overlay the first layer of graphene strips 36. The pair of graphene layers 36 and 40 is separated by a transparent (at the appropriate wavelength(s)) dielectric layer 42 of material such as BN, $SiO_2$, or the like. A first electrical contact terminal 44 (V+) is coupled to upper graphene strips 40, and a second electrical contact terminal 46 (V−) is coupled to lower graphene strips 36. FIG. 6 is a top view of optical modulator 30, showing the disposition of graphene strips 40 over dielectric layer 42.

The configuration of optical modulator 30 exhibits simplified tunability and modulation control, when compared to optical modulator 10 of FIG. 1. In addition, modulator 30 exhibits less effective capacitance than modulator 10 of FIG. 1, since modulator 30 utilizes a lower layer of graphene strips (strips 36) instead of a sheet of conductive material (layer 16), allowing for higher speed modulation. Preliminary analysis shows that tunability, modulation voltage, insertion loss (IL), and modulation speed of optical modulator 30 compare favorably to lithium niobate modulators.

It is to be understood that graphene-based plasmonic optical modulators formed in accordance with the principles of the present invention may also be configured to work in the transmission mode (as opposed to reflection). FIG. 7 illustrates an exemplary optical modulator 50 configured to operate in transmission mode. In this case, the substrate needs to be formed of an optically transparent material. Similar to (reflective) modulator 30, transmissive modulator 50 utilizes two separate layers of graphene strips 54, 56 that are separated by a transparent dielectric layer 58. Dielectric layer 58 is preferably formed of a very thin layer BN (so as to be as transparent as possible). While BN is preferred, it may be possible to replace BN with a lower cost $SiO_2$ layer, if the dielectric strength is sufficient.

As also shown in FIG. 7, a first electrical contact layer 60 is coupled to graphene strips 54 and a second electrical contact layer 62 is coupled to graphene strips 56. A pair of anti-reflective (AR) coatings 64, 66 are disposed on opposing surfaces of substrate 52 and used to minimize reflections, allowing the desired wavelength of interest to pass through the structure in the manner shown. In this embodiment, when the resonance of modulator 50 is tuned away from the wavelength of the incident beam, the light will pass through all of the layers of the modulator structure, exiting through its lower surface as shown. When modulator 50 exhibits a resonance at the wavelength of the incident beam, it will be absorbed by the surface plasmons. It is to be understood that in the transmissive configuration there may not be 100% absorption, since the optical signal at the modulator's resonant wavelength does not make a second pass through dielectric layer 58 and have another opportunity to be absorbed by the surface plasmons.

The graphene-based modulator as formed in accordance with the principles of the present invention can be made very small, very fast, and use very little power. The device is expected to have very good extinction ratio and linearity characteristics, with the nearly 100% modulation depth enabled by graphene, allowing for a single-device configuration. Tuning by electrostatic gating of the graphene means very low modulation voltages (i.e., about 100 mV or less), with no voltage applied between switching states (i.e., no "stand-by" applied voltage required), resulting in power consumption only while modulating.

Having thus described the basic concept of the invention, it will be apparent to those skilled in the art that the foregoing detailed disclosure is intended to be presented by way of example only, and is not limiting. Various alterations, improvements, and modifications will occur to those skilled in the art and are intended to be included within the scope of the invention, though not expressly stated herein. Accordingly, the invention is limited only by the following claims and equivalents thereto.

What is claimed is:

1. A plasmon-based optical modulator comprising
a substrate;
high reflectivity material disposed over the substrate;
a relatively thin dielectric layer disposed over a top major surface of the high reflectivity material;
a plurality of graphene strips disposed in parallel across a top major surface of the relatively thin dielectric layer, each graphene strip exhibiting a predetermined width w, with adjacent strips separated by a predetermined spacing s; and
an electrical contact coupled to the plurality of graphene strips, where the values of w, s, and a DV voltage applied to the plurality of graphene strips determines a resonant wavelength of the plasmon-based optical modulator at which an incoming optical beam is absorbed by surface plasmons created along an interface between the plurality of graphene strips and the dielectric layer, wherein the application of a modulating electrical signal to the plurality of graphene strips modulates the resonant wavelength of the plasmon-based optical modulator and provides a modulation between absorption and non-absorption of the incoming optical beam as a function of its wavelength.

2. The plasmon-based optical modulator as defined in claim 1, wherein the modulator operates as a reflective device, with a non-absorbed optical beam re-directed away from the modulator by the high reflectivity material.

3. The plasmon-based optical modulator as defined in claim 1, wherein the modulator operates as a transmissive device, with a non-absorbed optical beam passing through the layers of the modulator and exiting through the substrate.

4. The plasmon-based optical modulator as defined in claim 1, where in the substrate comprises a material selected from the group consisting of SiC, Al2 03 and Si02.

5. The plasmon-based optical modulator as defined in claim 1, wherein the substrate comprises intrinsic SiC and the high reflectivity material comprises a layer of n-type SiC.

6. The plasmon-based optical modulator as defined in claim 1, wherein the high reflectivity material comprises a layer of metal or a metal alloy.

7. The plasmon-based optical modulator as defined in claim 1, wherein the high reflectivity material comprises a layer of metal selected from the group consisting of: gold, silver, platinum, copper, and aluminum.

8. The plasmon-based optical modulator as defined in claim 1, wherein the high reflectively material comprises a dielectric mirror structure.

9. The plasmon-based optical modulator as defined in claim 8, wherein the dielectric mirror structure comprises a plurality of layers of alternating composition sufficient to provide optical reflectivity at selected wavelengths.

10. The plasmon-based optical modulator as defined in claim 9, wherein the dielectric mirror structure comprises alternating layers of silica and tantala.

11. The plasmon-based optical modulator as defined in claim 1, wherein the relatively thin dielectric layer comprises a material selected from the group consisting of: BN, $SiO_2$, $Al_2O_3$.

12. The plasmon-based optical modulator as defined in claim 1, wherein the relatively thin dielectric layer is formed to have an optical thickness about one-quarter of the value of the wavelength of the applied optical input signal.

13. The plasmon-based optical modulator as defined in claim 1, wherein the width w and spacing s of the plurality of graphene strips is selected to create a resonance centered at 1550 nm, adjustable over a wavelength range of 1500-1600 nm by adjusting the DC voltage applied to the plurality of graphene strips.

14. The plasmon-based optical modulator as defined in claim 1, wherein the modulator further comprises a an insulating layer disposed over the first plurality of graphene strips; and a layer of a second plurality of graphene strips of similar width and spacing, disposed over the insulating layer and arranged to essentially overlay the first plurality of graphene strips, with a DC voltage applied between the first plurality of graphene strips and the second plurality of graphene strips defining a density of plasmon carriers and determining a resonant wavelength of the modulator, and modulation of the voltage modulating the resonant wavelength and intensity of the optical signal between absorption and non-absorption.

15. The plasmon-based optical modulator as defined in claim 14, wherein the insulating layer comprises a material selected from the group consisting of: BN, $SiO_2$, and Al2O3.

16. The plasmon-based optical modulator as defined in claim 14, wherein the voltages on the order of about 100 mV are sufficient to provide modulation of the incoming optical signal.

17. The plasmon-based optical modulator as defined in claim 14, wherein the modulator operates at a speed up to about 300 GHz.

* * * * *